US012724443B2

(12) United States Patent
Sherigar

(10) Patent No.: US 12,724,443 B2
(45) Date of Patent: Sep. 1, 2026

(54) VOLTAGE REGULATOR

(71) Applicant: NXP B.V., Eindhoven (NL)

(72) Inventor: Arvind Sherigar, Bangalore (IN)

(73) Assignee: NXP B.V., Eindhoven (NL)

( * ) Notice: Subject to any disclaimer, the term of this patent is extended or adjusted under 35 U.S.C. 154(b) by 202 days.

(21) Appl. No.: 18/793,380

(22) Filed: Aug. 2, 2024

(65) Prior Publication Data

US 2025/0053185 A1 Feb. 13, 2025

(30) Foreign Application Priority Data

Aug. 10, 2023 (IN) ............................ 202311053674

(51) Int. Cl.

| | |
|---|---|
| ***G05F 1/46*** | (2006.01) |
| ***G05F 1/565*** | (2006.01) |
| ***G05F 3/26*** | (2006.01) |

(52) U.S. Cl.

CPC .............. *G05F 3/262* (2013.01); *G05F 1/468* (2013.01); *G05F 1/565* (2013.01)

(58) Field of Classification Search

CPC ... G05F 1/10; G05F 1/46; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595; G05F 1/607; G05F 1/61; G05F 1/613; G05F 1/614; G05F 1/618; G05F 1/62; G05F 1/66; G05F 1/26; G05F 1/561; G05F 1/567; G05F 1/569; G05F 1/571; G05F 1/573; G05F 1/5735; G05F 1/08; G05F 1/153; G05F 1/16; G05F 1/34; G05F 3/02; G05F 3/30; G05F 3/22; G05F 3/222; G05F 3/242; G05F 3/225; G05F 3/245; G05F 3/20; G05F 3/00; G05F 3/08; G05F 3/10; G05F 3/16; G05F 3/18; G05F 3/185; G05F 3/227; G05F 3/247; G05F 3/26; G05F 3/265; G05F 3/24; G05F 3/262

See application file for complete search history.

(56) References Cited

U.S. PATENT DOCUMENTS

| | | | | |
|---|---|---|---|---|
| 8,344,713 | B2 | 1/2013 | Shrivas et al. | |
| 2014/0176098 | A1 | 6/2014 | Fang et al. | |
| 2016/0124448 | A1 | 5/2016 | Murukumpet et al. | |
| 2021/0124380 | A1 | 4/2021 | Fort | |
| 2023/0409064 | A1* | 12/2023 | Upadhyaya | G05F 1/595 |

FOREIGN PATENT DOCUMENTS

| | | | |
|---|---|---|---|
| CN | 105005351 | B | 2/2017 |
| WO | WO-2020086150 | A2 | 4/2020 |
| WO | WO-2020086150 | A3 | 4/2020 |

OTHER PUBLICATIONS

M. Ho et al., "A CMOS Low-Dropout Regulator With Dominant-Pole Substitution," in IEEE Transactions on Power Electronics, vol. 31, No. 9, pp. 6362-6371, Sep. 2016.

* cited by examiner

*Primary Examiner* — Bryan R Perez

(57) ABSTRACT

The present disclosure relates to a voltage regulator for outputting a regulated output voltage to an integrated circuit, the voltage regulator including a voltage supply terminal for receiving a supply voltage; an output terminal for outputting the regulated output voltage; a reference terminal; a feed-forward Wilson current mirror; and a flipped voltage follower, FVF.

20 Claims, 6 Drawing Sheets

VOLTAGE REGULATOR

CROSS-REFERENCE TO RELATED APPLICATIONS

This application claims priority under 35 U.S.C. § 119 to Indian Patent Application number 202311053674, filed Aug. 10, 2023, the contents of which are incorporated by reference herein.

FIELD

The present disclosure relates to a voltage regulator and in particular to a voltage regulator for outputting a regulated output voltage to an integrated circuit.

SUMMARY

According to a first aspect of the present disclosure there is provided a voltage regulator for outputting a regulated output voltage to an integrated circuit, the voltage regulator comprising:

- a voltage supply terminal for receiving a supply voltage;
- an output terminal for outputting the regulated output voltage;
- a reference terminal;
- a feedforward Wilson current mirror comprising:
  - a Wilson current mirror with an input current terminal and an output current terminal;
  - an input current source coupled between the supply voltage terminal and the input current terminal of the Wilson current mirror;
  - a feedforward capacitor arranged in parallel with the input current source; and
  - an output current transistor with a conduction channel coupled between the supply voltage terminal and the output current terminal of the Wilson current mirror; and
- a flipped voltage follower, FVF, comprising:
  - a pass transistor comprising a conduction channel coupled between the supply voltage terminal and the output terminal;
  - a first FVF transistor with a conduction channel coupled between the output voltage and a FVF node;
  - a second FVF transistor with a conduction channel coupled between a gate of the pass transistor and the FVF node;
  - a third FVF transistor with a conduction channel coupled between the supply voltage terminal and the gate of the pass transistor, wherein a gate of the third FVF transistor is coupled to a gate of the output current transistor; and
  - a FVF current source coupled between the FVF node and the reference terminal.

The feedforward Wilson current mirror can move a pole at a gate of the pass transistor of the FVF in response to voltage transients and advantageously help the voltage at the output terminal remain stable.

In one or more embodiments, the FVF further comprises a pull-down transistor with a conduction channel coupled between the output terminal and the reference terminal and a gate terminal coupled to the FVF node.

In one or more embodiments, the pull-down transistor is configured to activate in response to a supply voltage transient at the supply voltage terminal or a load transient at the output terminal.

In one or more embodiments, the pull-down resistor comprises an activation threshold such that the pull-down transistor is configured to activate in response to a supply voltage transient at the supply voltage terminal or a load transient at the output terminal.

In one or more embodiments, the pull-down resistor comprises a NMOS transistor.

In one or more embodiments, the feedforward capacitor comprises a PMOS transistor.

In one or more embodiments, the FVF comprises a pass capacitor coupled between the gate of the pass transistor and the output voltage terminal, wherein the pass capacitor comprises a PMOS transistor.

In one or more embodiments, the feedforward capacitor comprises a PMOS transistor of the same type as the pass capacitor.

In one or more embodiments, the voltage regulator is suitable for suppressing voltage transients with a specific ramp rate wherein a capacitance of the feedforward capacitor is based on the ramp rate.

In one or more embodiments, the output current transistor and the third FVF transistor form a current mirror. In one or more embodiments, a size ratio of the third FVF transistor to the output current transistor determines a scaling factor of the current mirror.

In one or more embodiments, the feedforward Wilson current mirror comprises a source follower circuit coupled between the supply voltage terminal and the reference terminal. In one or more embodiments, the source follower circuit is configured to prevent a voltage at the input current terminal falling below a threshold current value.

In one or more embodiments, the voltage regulator comprises a bandgap reference circuit including a bandgap based current reference source configured to provide a control voltage to a gate terminal of the first FVF transistor.

In one or more embodiments, the pass transistor comprises a PMOS transistor. In one or more embodiments, the first FVF transistor comprises a PMOS transistor. In one or more embodiments, the third FVF transistor comprises a PMOS transistor. In one or more embodiments, the output current transistor comprises a PMOS transistor. In one or more embodiments, the second FVF transistor comprises a NMOS transistor.

In one or more embodiments, the voltage regulator comprises a low dropout voltage regulator.

According to a second aspect of the present disclosure, there is provided a transceiver for a controller area network comprising any voltage regulator described herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

The Controller Area Network (CAN bus) is a message-based protocol designed to allow the Electronic Control Units (ECUs) of vehicles to communicate with each other. The ECUs may be coupled to transceivers for sending and receiving messages on the CAN bus. The ECUs may include a microcontroller for controlling a specific sub-circuit (sensors, actuators etc). The microcontrollers operate at a low-voltage which has evolved from 5V to 1.8V. The transceivers typically include a low-power digital section that is always powered on and includes an integrated circuit that can communicate with the microcontroller. The low-power section of the transceiver may include a low drop-out (LDO) voltage regulator (which may be referred to herein as simply a LDO) for providing the low-voltage used for the always-on digital domain within the transceiver chip.

Automotive environments are typically harsh operating environments and the CAN bus can be tens of metres in length. This can result in a noisy supply voltage for the LDO via mutual inductance and electromagnetic interference (EMI) from other signals. The LDO should provide a stable low-voltage output for a wide range of supply voltage, including EMI spikes, to avoid damaging the integrated circuit (IC) of the digital section of the transceiver. The LDO should also maintain a stable output voltage in response to fast changes in the output load. The LDO should also have a low consumption current as it is always on.

Voltage regulators of the present disclosure can: respond to fast line and load transients and address the problem of electromagnetic compatibility (EMC) immunity; operate from a supply that has a wide range; and consume low quiescent current.

Figure 1:
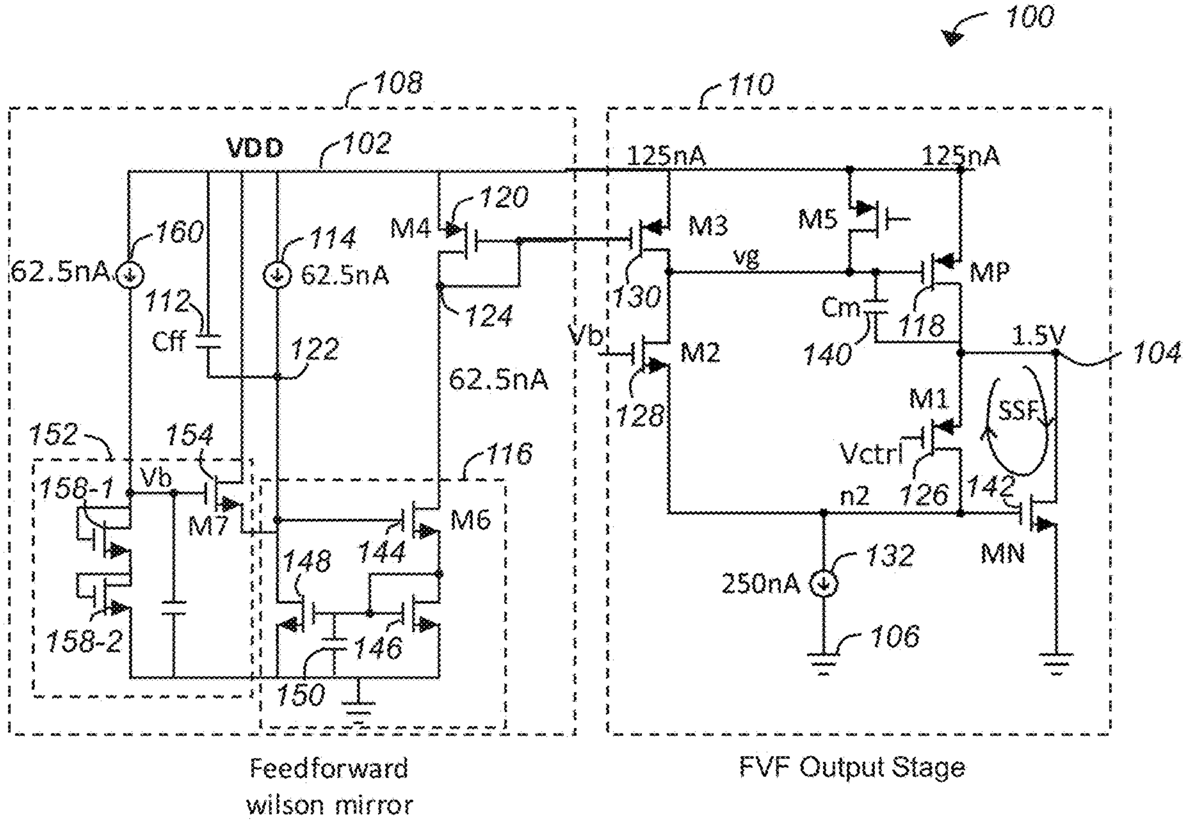
FIG. 1 illustrates a voltage regulator for outputting a regulated output voltage to an integrated circuit according to an embodiment of the present disclosure.

FIG. 1 illustrates a voltage regulator 100 for outputting a regulated output voltage to an integrated circuit according to an embodiment of the present disclosure. In this example the voltage regulator is a LDO.

The voltage regulator 100 comprises: a supply voltage terminal 102 (labelled VDD) for receiving a supply voltage; an output voltage terminal 104 (labelled 1.5V) for outputting the regulated output voltage; and a reference terminal 106, which in this example is a ground voltage.

The voltage regulator 100 further includes a feedforward Wilson current mirror 108 coupled to a flipped voltage follower (FVF) 110. The feedforward Wilson current mirror 108 includes a feedforward capacitor 112 (labelled Cff) coupled in parallel to an input current source 114, between the supply voltage terminal 102 and a Wilson current mirror 116. The feedforward capacitor 112 produces a current through the Wilson current mirror 116 that is proportional to any voltage transients dV/dt at the supply voltage terminal 102. As a result, a pole at a gate of a pass transistor 118 (labelled MP) of the FVF 110 moves in response to the voltage transient and advantageously helps the voltage at the output terminal 104 to remain stable.

In more detail, the feedforward Wilson current mirror 108 comprises: the Wilson current mirror 116; the input current source 114; the feedforward capacitor 112 and an output current transistor 120 (labelled M4). The Wilson current mirror 116 includes an input current terminal 122 and an output current terminal 124. In this example, the Wilson current mirror 116 is coupled to the reference terminal 106. The input current source 114 is coupled between the supply voltage terminal 102 and the input current terminal 122 of the Wilson current mirror 116. In this example, the input current source 114 provides an input current of 62.5 nA. The feedforward capacitor 112 is coupled in parallel with the input current source 114 (between the supply voltage terminal 102 and the input current terminal 122). The output current transistor 120 comprises a conduction channel coupled between the supply voltage terminal 102 and the output current terminal 124 of the Wilson current mirror 116. In this example, the output current transistor 120 comprises a PMOS (p-type metal oxide semiconductor) transistor with a source coupled to the supply voltage terminal 102 and a drain coupled to the output current terminal 124.

The FVF 110 comprises: the pass transistor 118, a first FVF transistor 126 (labelled M2); a second FVF transistor 128 (labelled M2); and a third FVF transistor 130 (labelled M3); and a FVF current source 132. The pass transistor 118 includes a conduction channel coupled between the supply voltage terminal 102 and the output terminal 104. In this example, the pass transistor 118 is a PMOS transistor with a source coupled to the supply voltage terminal 102 and a drain coupled to the output terminal 104. The first FVF transistor 126 includes a conduction channel coupled between the output voltage terminal 104 and a FVF node n2. In this example, the first FVF transistor 126 is a PMOS transistor with a source coupled to the output voltage terminal 104 and a drain coupled to the FVF node n2. The second FVF transistor 128 includes a conduction channel coupled between a gate of the pass transistor 118 and the FVF node n2. In this example, the second FVF transistor 128 is a NMOS (n-type metal oxide semiconductor) transistor with a source coupled to the FVF node n2 and a drain coupled to the gate of the pass transistor 118. The third FVF transistor 130 includes a conduction channel coupled between the supply voltage terminal 102 and the gate of the pass transistor 118. In this example, the third FVF transistor 130 is a PMOS transistor with a source coupled to supply voltage terminal 102 and a drain coupled to the gate of the pass transistor 118. A gate of the third FVF transistor 130 is coupled to a gate of the output current transistor 120 to form a current mirror. The FVF current source 132 is coupled between the FVF node n2 and the reference terminal 104.

In this example, a gate of the first FVF transistor 126 is configured to receive a control voltage, Vctrl, that provides a reference to the FVF 110. A gate of the second FVF transistor 128 is configured to receive a bias voltage, Vb, discussed further below.

In this example, a size ratio of the output current transistor 120 and the third FVF transistor 130 is selected to provide a scaling factor of two for the current mirror formed by the output current transistor 120 and the third FVF transistor 130. As a result, a nominal current of 125 nA flows in each leg (M3-M2 and MP-M1) of the FVF 110. The FVF current source comprises a 250 nA current source (equal to the sum of the 2×125 nA legs).

In operation, the feedforward Wilson current mirror 108 can generate a current through the output current transistor 120 and the third FVF transistor 130 that is proportional to any supply voltage transient dV/dt on the supply voltage terminal 102. In the event of a large transient on the supply voltage terminal 102, e.g. from 1.7V to 5.5V with a ramp rate of 10V/us, the feedforward capacitor 112 can generate a proportional transient current. This proportional current is added to the input current of the input current source 114 and the Wilson current mirror 116 outputs the sum of the proportional transient current and the input current to the output current transistor 120. This increased transient current is mirrored through the third FVF transistor 130. As a result, a dominant pole on node vg at the gate of the pass transistor 118 moves at the appropriate dv/dt and suppresses transient effects at the output terminal 104. In other words, the current gain from the feedforward capacitor 112 regulates a gate voltage, vg, at the gate of the pass transistor 118 to follow any supply voltage transients at the supply voltage terminal 102 (which is coupled to the source of the pass transistor 118). Therefore, transients in the source-gate voltage of the pass transistor 118 and resulting transients in an output voltage at the output voltage terminal 104 are suppressed.

During a direct power injection (DPI) event on the CAN bus, due to the mutual coupling of the bondwires, the internal supply voltage on the supply voltage terminal 102 and a reference voltage at the reference terminal 104 can be quite erratic and can have supply transients of the order of 10V/us and with a magnitude of several volts. The feedforward Wilson current mirror 108 helps address the transients without requiring significant bias current or circuits with complicated and/or interacting loops which can make the design very difficult to manage.

Figure 2:
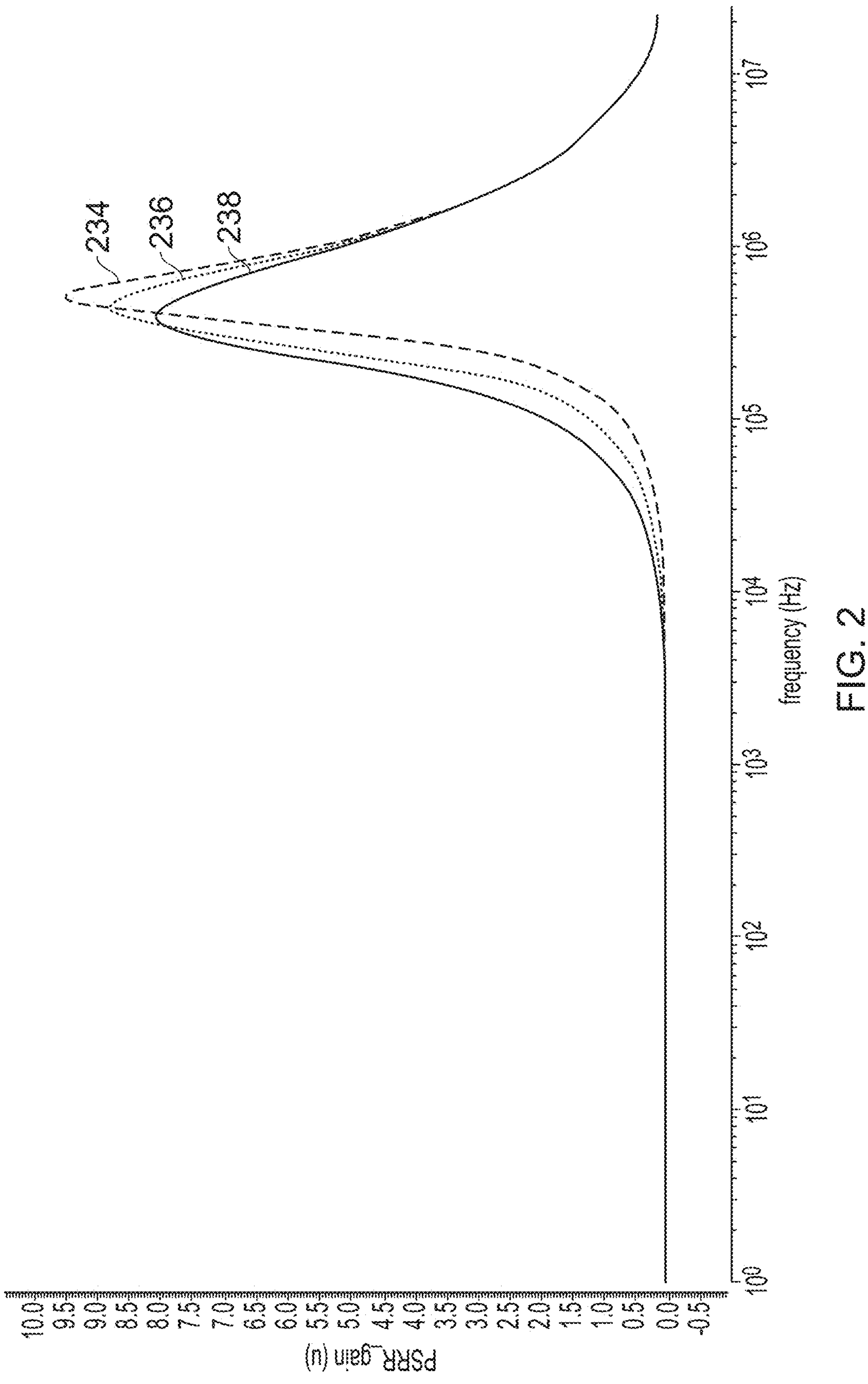
FIG. 2 illustrates the feedforward transfer function of the feedforward Wilson current mirror as a function of frequency.

FIG. 2 illustrates the feedforward transfer function, Gmff (Iout/VDD), of the feedforward Wilson current mirror 108 as a function of frequency, where Iout is the current at the output terminal 124 of the Wilson current mirror 126. The capacitance, Cff, of the feedforward capacitor 112 can be tuned to achieve the targeted supply voltage transient, dv/dt, in the supply voltage, VDD, on the supply voltage terminal 102.

To respond to a supply voltage transient, dv/dt, of 10V/us with an amplitude of 5V and meet EMC targets, we can write:

$$A*\omega = \frac{dv}{dt}$$

$$5\omega = 10^6$$

$$f \cong 320 \text{ kHz}$$

FIG. 2 includes a first plot 234 illustrating the transfer function peak as a function of frequency for a capacitance, Cff, of 300 fF. A second plot 236 illustrates the transfer function peak as a function of frequency for Cff=500 fF. A third plot 238 illustrates the transfer function peak as a function of frequency for Cff=800 fF. The plots illustrate that as we increase the capacitance, Cff, of the feedforward capacitor 112 from 300 fF to 800 fF, the peak of the Gmff transfer function moves left to lower frequencies. In this way, the capacitance, Cff, of the feedforward capacitor 112 can be selected for a frequency corresponding to a particular target supply voltage transient (defined by A and dv/dt).

Returning to FIG. 1, the additional current generated by the feedforward capacitor 112 and mirrored by the Wilson current mirror 116 charges a pass capacitor 140 with capacitance Cm, on the gate of the pass transistor. The pass capacitor 140 is coupled between the gate terminal of the pass transistor 118 and the output terminal 104 (and the drain terminal of the pass transistor 118). As referred to herein, the pass capacitor may refer to a discrete capacitor coupled between the gate terminal and drain terminals of the pass transistor 118 and/or any intrinsic capacitance between the gate and drain terminal of the pass transistor 118 (i.e. it is the total gate-drain capacitance). In some examples, the feedforward capacitor 112 is provided as a PMOS transistor. In some examples, the pass capacitor 140 is provided as a PMOS transistor. In some examples, the feedforward capacitor 112 is made using the same type of PMOS transistor as the pass capacitor 140. As a result, the capacitance of the two capacitors 112, 140 can track each other across process corners and cancel each other. This can provide almost perfect cancellation.

However, perfect cancellation is not possible due to an inherent delay of the Wilson current mirror 116. As a result, there is some spiking in the output voltage at the output voltage terminal 104. In this example, the FVF 110 includes a pull-down transistor 142 (labelled MN). The pull-down transistor 142 comprises a conduction channel coupled between the output terminal 104 and the reference terminal 106. The pull-down transistor 112 comprises a gate terminal coupled to the FVF node, n2. In this example, the pull-down transistor comprises a NMOS transistor with a source terminal coupled to the reference terminal 106 and a drain terminal coupled to the output terminal 104. The first FVF transistor 126 and the pull-down transistor 142 form a super source follower (SSF) that acts to quickly pull down any transient increase in output voltage at the output voltage terminal 104.

Both the feedforward Wilson current mirror and the FVF with the super source follower can combine to provide a LDO solution that can be tuned for any supply voltage transient dv/dt to achieve EMC requirements.

The FVF 110 is biased with a low current of 250 nA of the FVF current source 132. The pass transistor 118 can provide the DC load current demanded by the switching digital logic of the IC.

The additional pull-down transistor 142 can provide a pull down on the output terminal 104 during a load release event. When the DC load current is reduced from full load to no load very quickly and/or during a transient event on the supply voltage terminal 102, the output voltage at the output terminal 104 of the LDO 100 tends to go higher and in some cases can go as high as the supply voltage, VDD, itself. This can seriously jeopardize the downstream digital logic of the IC connected to the output terminal 104 which cannot handle high voltages and may get damaged or result in a reduced lifetime depending on the voltage exposure. The first FVF transistor 126 and the pull-down transistor 142 form a super source follower loop that gets activated during this output voltage peak scenario. When the output voltage goes high at the output terminal 104, a voltage at the FVF node, n2, also goes high thereby activating the pull-down transistor 142. As a result, the output voltage at the output voltage terminal is maintained within limits acceptable to the transistors used in the digital domain of the IC. When the FVF node, n2, goes high, the second FVF transistor 128 is shut off and hence only the super source follower loop is actively pulling down the output voltage at the output terminal 104. In some examples, the pull-down transistor 142 can comprise a relatively high threshold voltage to ensure that the pull-down transistor 142 only gets activated during a transient event specifically to pull the output voltage down and that the pull-down transistor 142 is inactive and does not actively consume DC current at other times. The super source follower loop made of transistors M1 and MN (first FVF transistor 126 and pull-down transistor 142) and the main FVF loop consisting of transistors M1, M2, M3 and MP (first, second and third FVF transistors 126, 128, 130 and pass transistor 118) are mutually exclusive and do not interact with each other.

Figure 3:
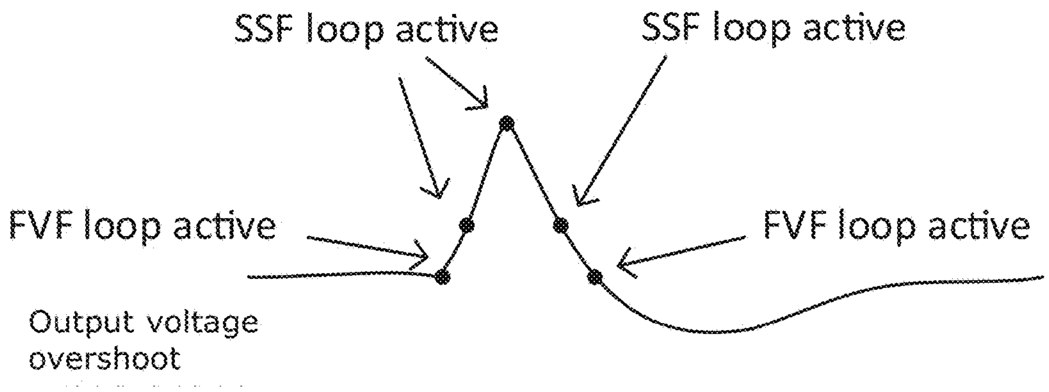
FIG. 3 schematically illustrates which loop is active during a transient peak in the output voltage at the output terminal.

FIG. 3 schematically illustrates which loop is active during a transient peak in the output voltage at the output terminal 104. At the start of the transient peak the FVF loop is active providing the DC load current. As the voltage rises, the voltage at the FVF node, n2, goes high activating the pull-down transistor 142 (and SSF loop) and deactivating the second FVF transistor (and FVF loop). The SSF suppresses the voltage transient peak at the output terminal 104. As the voltage at the output terminal falls to the nominal operating value, the voltage at the FVF node, n2, goes low deactivating the pull-down transistor (and SSF loop) and activating the second FVF transistor 128 (and FVF loop).

The LDO 100 consumes very low current (~500 nA) and is suitable for a low power application. For some applications, the output capacitance may comprise a parasitic capacitance of an on-chip decap (a supply decoupling capacitor (from supply to ground)) and the digital load of the IC. Hence, the capacitance may be on the order of 100 pF to 500 pF. As a result, a second pole is at the output terminal 104 and the dominant pole, vg, is at the gate of the pass transistor 118. During a load transient event the gate node, vg, has to move quickly in response to the dip in the output. This is accomplished using the pass capacitor, Cm. For example, when the load changes from 0 to 1 mA in a step, the output voltage, Vout, at the output voltage terminal 104 dips and couples to the gate of the pass transistor 118 through the pass capacitor, Cm, which in turn causes a dip in the gate voltage, vg, at the gate terminal of the pass transistor 118. This provides extra current through the pass transistor 118 which is supplied to the output load.

In this example, the FVF 110 includes a start-up transistor 131 (labelled as M5). The start-up transistor 131 comprises a PMOS transistor with: a source coupled to the supply voltage terminal 104; a drain coupled to the gate of the pass transistor 118; and a gate terminal configured to receive a start-up signal from a start-up circuit (described below in relation to FIG. 4). The start-up transistor 131 is enabled (via the start-up signal) during a start-up of the LDO when the control voltage, Vctrl, has not reached a nominal value. When the control voltage, Vctrl, reaches the nominal value the start-up transistor 131 is disabled (via the start-up signal). Once the start-up transistor 131 is disabled, the FVF 110 starts to power up.

The design of a Wilson current mirror 116 is known and only briefly described here for completeness. In this example, the Wilson current mirror 116 includes a first NMOS transistor 144 a second NMOS transistor 146 and a third NMOS transistor 148. A drain of the first NMOS transistor 144 is connected to the output current terminal 124. A gate of the first NMOS transistor 144 is connected to the input current terminal 122. A source of the first NMOS transistor 144 is connected to a drain of the second NMOS transistor 146. The source of the second NMOS transistor 146 is connected to the reference terminal 106. A gate of the second NMOS transistor 146 is connected to the drain of the second NMOS transistor 146 and a gate of the third NMOS transistor 148. The source of the third NMOS transistor 148 is connected to the reference terminal 106. A drain of the third NMOS transistor is connected to the input current terminal 122 (and the gate of the first NMOS transistor 144). The Wilson current mirror 116 further includes a mirror capacitor 150 connected between a node connecting the gates of the second and third NMOS transistors 146, 148 and the reference terminal 106.

In this example, the feedforward Wilson current mirror 108 further includes a source follower circuit 152 coupled between the supply voltage terminal 102 and the reference terminal 106. The source follower circuit 152 includes a NMOS source follower transistor 154 comprising: a drain terminal connected to the voltage supply terminal 102; and a source terminal connected to the input current terminal 122. A source follower capacitor 156 is connected between a gate terminal of the source follower transistor 154 and the reference terminal 106. Two diode connected NMOS transistors 158-1, 158-2 are connected between the gate terminal of the source follower transistor 154 and the reference terminal. A source follower current source 160 is connected between the supply voltage terminal and the gate of the source follower transistor 154. In this example, the source follower current source 160 provides the same current as the input current source 114. The two diode connected NMOS transistors 158-1, 158-2 provide the bias voltage, Vb, at the gate of the source-follower transistor 154 and the gate of the second FVF transistor 128. In the event of a transient dip in the supply voltage on the supply voltage terminal 102, the source follower circuit 152 maintains the voltage at the input current terminal 122 and stops it going negative. In this way, the source follower circuit prevents a voltage at the input current terminal falling below a threshold current value.

Figure 4:
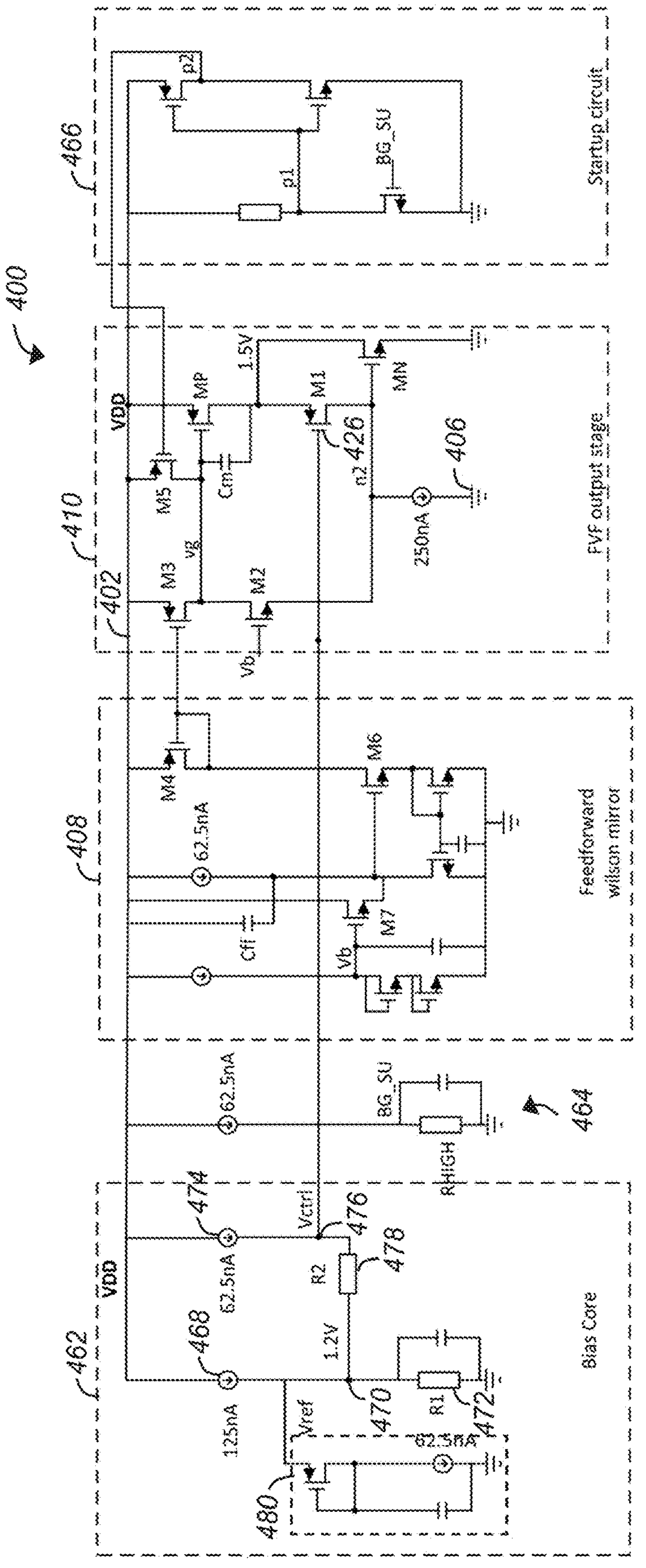
FIG. 4 illustrates the LDO of FIG. 1 with further additional control and output circuitry according to an embodiment of the present disclosure.

FIG. 4 illustrates the LDO voltage regulator of FIG. 1 with further additional control and output circuitry according to an embodiment of the present disclosure. Some features of FIG. 4 that are present in FIG. 1 have been given corresponding numbers in the 400 series and will not necessarily be described again here.

The LDO 400 includes the feedforward Wilson current mirror 408 and the FVF 410 described above in relation to FIG. 1. In this example, the LDO further includes a bias core circuit 462, and startup circuitry 464, 466.

The bias core circuit 462 generates the control voltage, Vctrl, that is coupled to the gate of the first FVF transistor and used as a reference for the FVF 410. The bias core circuit 462 comprises a (precise) bandgap based current reference source 468 coupled between the voltage source terminal 402 and a reference node 470 (labelled 1.2V). In this example, the current reference source 468 provides a precise current of 125 nA. A first reference resistor 472 (labelled R1) is connected between the reference node 470 and the reference terminal 406. In this example a reference capacitor is coupled in parallel with the first reference resistor 472. The first reference resistor has a resistance, R1, to provide a reference voltage of 1.2V at the reference node 470 (R1=1.2/62.5e−9=19.2 MΩ).

In this example, the bias core circuit comprises further reference circuitry 480 for providing a further reference circuit to a fast POR (power-on reset) circuit (not illustrated) which may be coupled to the output terminal 404 of the LDO. The reference circuitry comprises a reference transistor 479 comprising a PMOS transistor with: a source coupled to the reference node 470; a drain coupled to a second reference node 471; and a gate coupled to the second reference node 471. The second reference node 471 is coupled to the reference terminal 406 by a third bandgap based reference current source 473, which in this example provide 125 nA. A further reference capacitor is coupled in parallel with the third bandgap based reference current source 473.

In this example, the bias core circuit 462 includes: a second bandgap based reference current source 474 coupled between the voltage supply terminal 402 and a control voltage node; and a second reference resistor 478 coupled between the control voltage node 476 and the second reference voltage node 471. The second reference resistor is used to generate 300 mV voltage increase from the second reference node 471 to the control voltage node 476. In this way, the control voltage will comprise 1.5 V−vgs_ref, where vgs_ref is the gate-source voltage of the reference transistor 479. In this example, the second resistor comprises a resistance of 4.8 MΩ(R2=0.3/62.5e−9). Providing a control voltage, Vctrl, of 1.5−vgs_ref can provide a nominal output voltage of 1.5 V at the output terminal 404 (due to gate-source voltage step at first FVF transistor 426).

In other examples, the control voltage, Vctrl, and/or other reference voltages may be generated using other known reference voltage generating methods.

The illustrated approach using bandgap reference current sources advantageously provides a temperature compensated control voltage, Vctrl.

In this example, the startup circuitry comprises a startup circuit 456 and a bandgap startup reference circuit 464. The startup circuit 456 provides the startup signal to the gate of the startup transistor 431, described above. The bandgap startup reference circuit 464 provides a bandgap startup signal (labelled BG_SU) to the start-up circuit. When the bandgap reference current sources 468, 474, 473, of the bias core circuit 462 come up, a bandgap startup reference current source 465 is also up and flows through a bandgap startup reference resistor, RHIGH, thereby generating the bandgap startup signal, BG_SU, indicating that the bandgap current references are up (and Vctrl is at the nominal value (1.5V−vgs_ref)). The start-up circuit 466 is configured to receive the bandgap startup signal, BG_SU, and provide the corresponding startup signal to the gate of the startup transistor 431 of the FVF 410 to enable/disable the startup transistor 431 accordingly.

Figure 5:
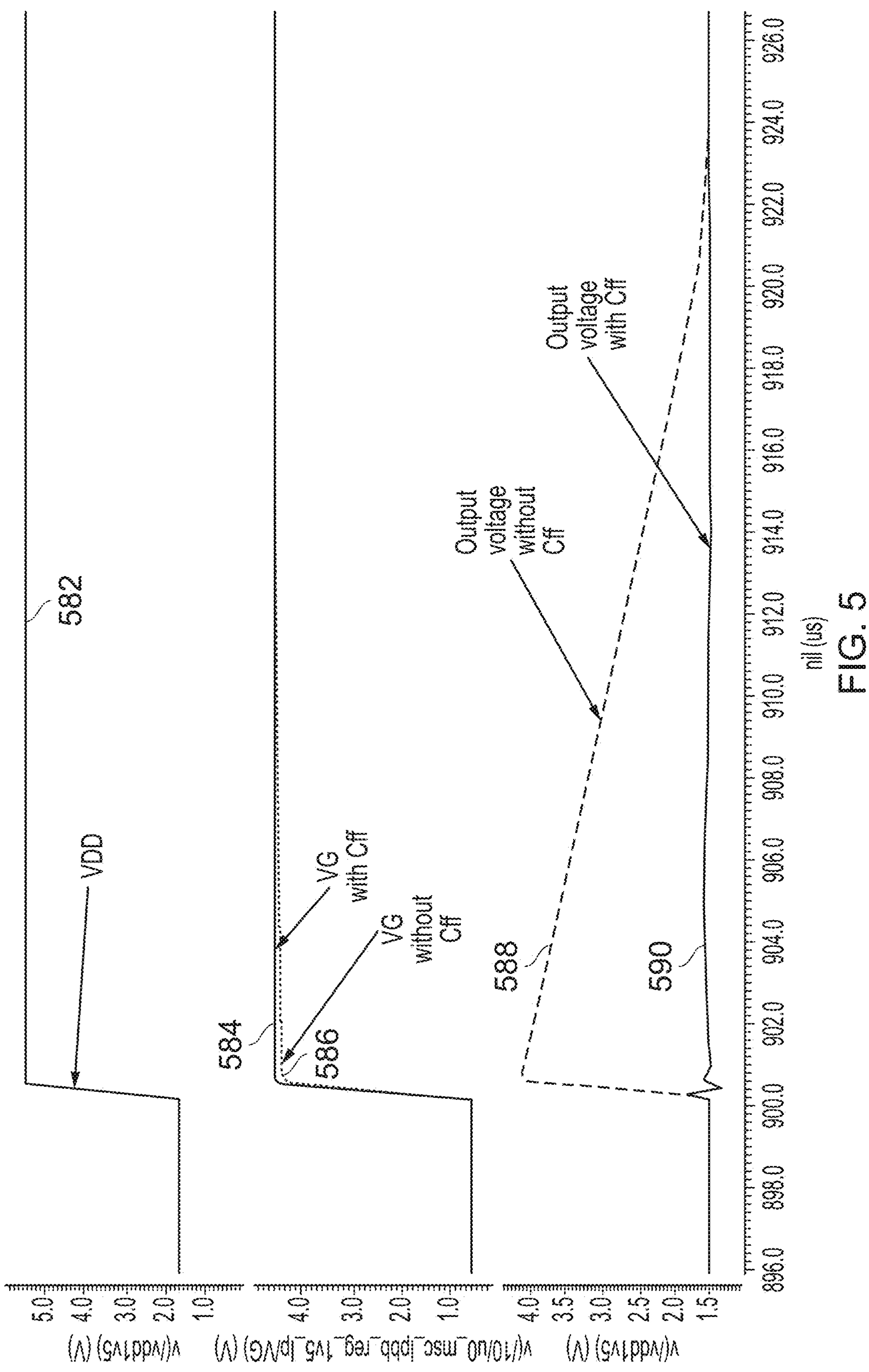
FIG. 5 illustrates the performance of an LDO according to an embodiment of the present disclosure.

FIG. 5 illustrates the performance of a voltage regulator according to an embodiment of the present disclosure. The voltage regulator may comprise the LDO of FIG. 1 or 4.

An upper plot 582 illustrates a voltage transient in the supply voltage, VDD, at the supply terminal, comprising a voltage step from 1.8V to 5.4V when the LDO is providing full load current. Two intermediate plots 584, 586 illustrate the response of the gate voltage, vg, at the gate of the pass transistor to the supply voltage transient. A first intermediate plot 584 illustrates the response of the gate voltage, vg, for the LDO of FIG. 1 or 4. A second intermediate plot 586 illustrates the response of the gate voltage, vg, for the same circuit but without the feedforward capacitor. The first and second intermediate plots 584, 586 indicate a rise in the gate voltage, vg, as the supply voltage, VDD, increases. The first intermediate plot 584 rises faster than the second intermediate plot 586 because the feedforward capacitor helps the gate voltage, vg, to track the supply voltage, VDD.

Two lower plots 588, 590 illustrate the response of the output voltage at the output terminal to the supply voltage transient. A first lower plot 588 illustrates the response of the output voltage for the LDO of FIG. 1 or 4. A small transient ripple can be seen that peaks at less than 2V and quickly settles (<1 us) to the nominal output voltage of 1.5V. A second lower plot 590 illustrates the response of the output voltage for the same circuit of FIG. 1 or FIG. 4 but without the feedforward capacitor. The output voltage rises to over 4V and takes a long time (24 us) to fall back to 1.5V.

Figure 6A:
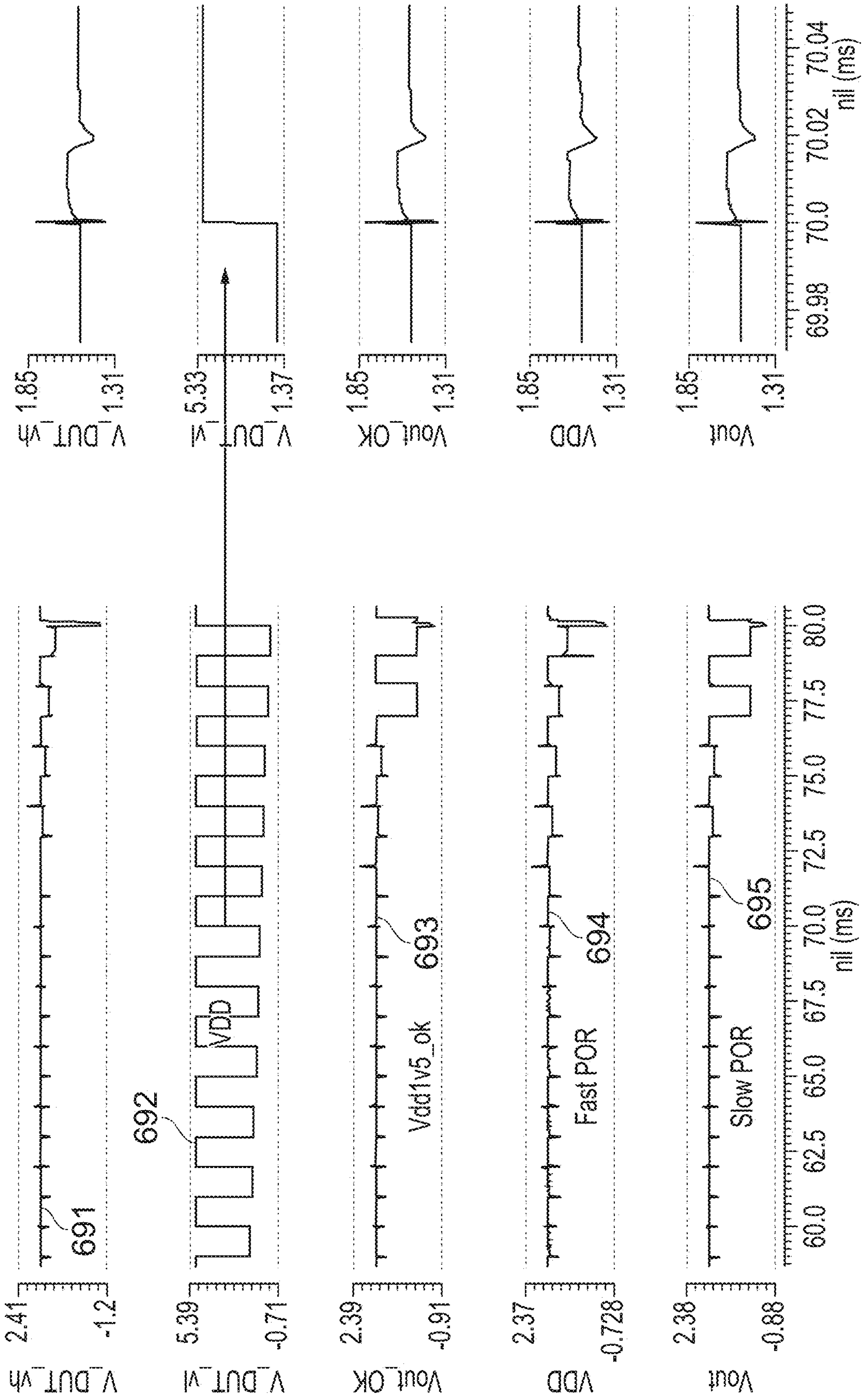
FIG. 6A illustrates the response of the LDO of FIG. 4 to a transient on the supply voltage terminal comprising a square wave transient with increasing amplitude.

FIG. 6A illustrates the response of the LDO of FIG. 4 to a transient on the supply voltage terminal comprising a square wave transient with increasing amplitude.

A first plot 691 illustrates the output voltage, Vout, of the LDO. A second plot 692 illustrates the supply voltage on the supply voltage terminal. A third plot 693 illustrates a output voltage check signal, Vout_OK, which indicates that the output voltage of the LDO is ok. This is a combination (AND function) of the fast POR and slow POR. A fourth plot 694 illustrates a voltage of a fast POR circuit. A fifth plot 695 illustrates a voltage of a slow POR circuit.

The figure illustrates that transients in the output voltage 691 remain below 2V and quickly settle back to 1.5 V until an amplitude of the square wave on the supply voltage becomes unmanageable.

Figure 6B:
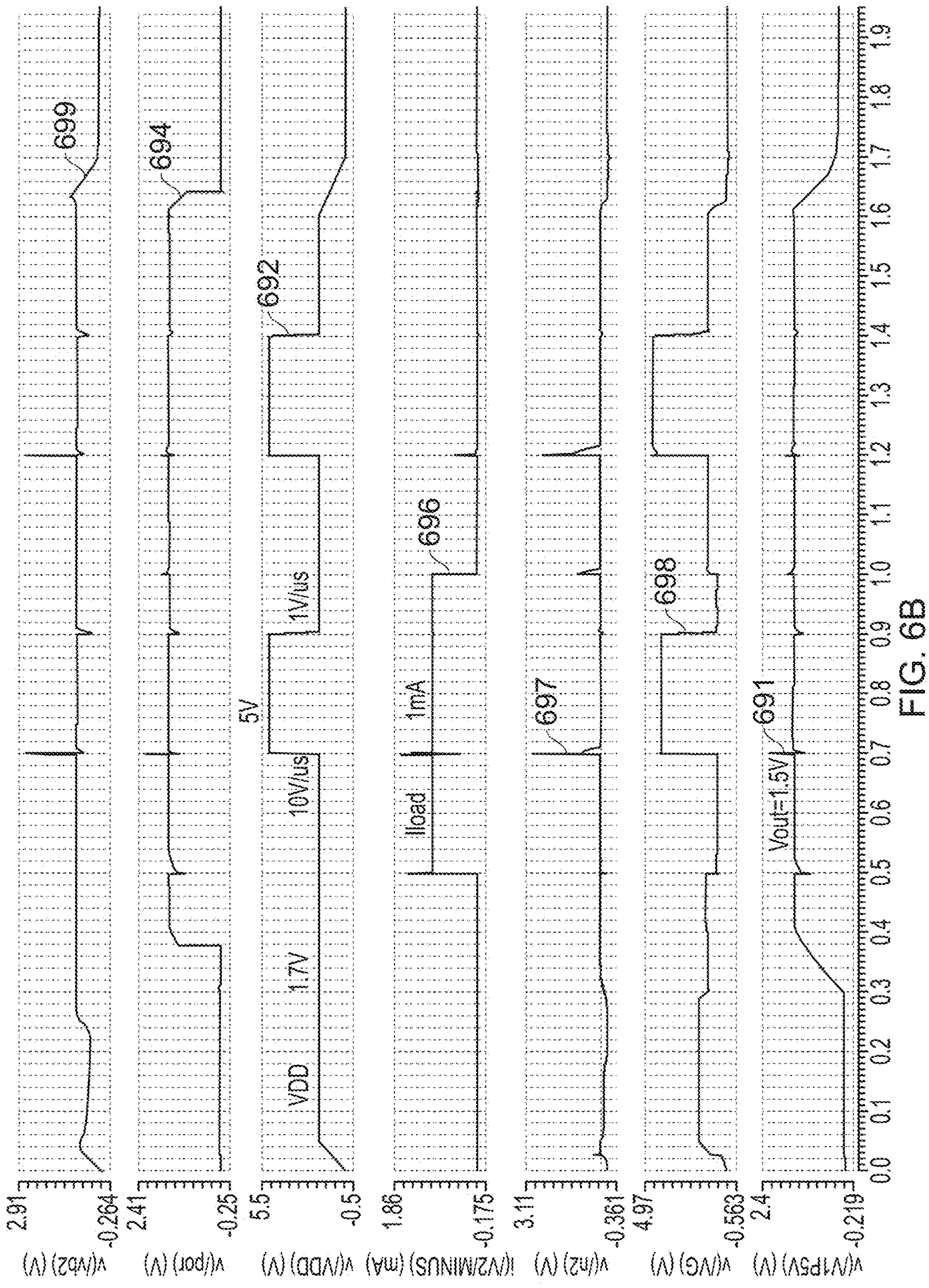
FIG. 6B illustrates the response of the LDO of FIG. 4 during a load and line step event.

FIG. 6B illustrates the response of the LDO of FIG. 4 during a load and line step event. In particular a response to a test sequence (Powerup, load step, line step up, line step down, load release, line step up, line step down, and power down) is illustrated.

A first plot 691 illustrates the output voltage at the output terminal. A second plot 692 illustrates the supply voltage on the supply voltage terminal. A third plot 694 illustrates a voltage of a fast POR circuit. A fourth plot 696 illustrates the application and removal of a load current, Iload, of 1 mA. A fifth plot 697 illustrates the variation in the voltage at the FVF node n2. An sixth plot 698 illustrates the variation in the gate voltage, vg, of the pass transistor. A seventh plot 699 illustrates a voltage at the input current terminal.

The plots illustrate that the output voltage 699 is maintained close to 1.5V even in response to large voltage transients on the supply voltage 692 or in the load current 696. Small ripples in the output voltage 699 remain below 2.4V and rapidly return to the nominal value of 1.5V.

The present disclosure provides a voltage regulator comprising a feedforward Wilson current mirror to generate a compensation current in response to voltage transients. The compensation current can be used to control the gate voltage of a pass transistor of a FVF to reduce transients at the output terminal. The FVF may include a SSF loop to rapidly pull-down transient peaks at the output terminal. The feedforward Wilson current mirror and the FVF with SSF can be tuned to suit EMI requirements.

The disclosed voltage regulators can provide a robust EMI tolerant low power PMOS LDO that can survive fast supply voltage changes and load transients and maintain proper regulation. The disclosed voltage regulators can operate with low consumption current providing a low power solution for a LDO for a CAN bus transceiver which should always be available in low power mode.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A voltage regulator for outputting a regulated output voltage to an integrated circuit, the voltage regulator comprising:
- a voltage supply terminal for receiving a supply voltage;
- an output terminal for outputting the regulated output voltage;
- a reference terminal;
- a feedforward Wilson current mirror comprising:
  - a Wilson current mirror with an input current terminal and an output current terminal;
  - an input current source coupled between the supply voltage terminal and the input current terminal of the Wilson current mirror;
  - a feedforward capacitor arranged in parallel with the input current source; and
  - an output current transistor with a conduction channel coupled between the supply voltage terminal and the output current terminal of the Wilson current mirror; and
- a flipped voltage follower, FVF, comprising:
  - a pass transistor comprising a conduction channel coupled between the supply voltage terminal and the output terminal;
  - a first FVF transistor with a conduction channel coupled between the output voltage and a FVF node;
  - a second FVF transistor with a conduction channel coupled between a gate of the pass transistor and the FVF node;
  - a third FVF transistor with a conduction channel coupled between the supply voltage terminal and the gate of the pass transistor, wherein a gate of the third FVF transistor is coupled to a gate of the output current transistor; and
  - a FVF current source coupled between the FVF node and the reference terminal.

2. The voltage regulator of claim 1, wherein the FVF further comprises a pull-down transistor with a conduction channel coupled between the output terminal and the reference terminal and a gate terminal coupled to the FVF node.

3. The voltage regulator of claim 2, wherein the pull-down transistor is configured to activate in response to a supply voltage transient at the supply voltage terminal or a load transient at the output terminal.

4. The voltage regulator of claim 3, wherein the pull-down resistor comprises an activation threshold such that the pull-down transistor is configured to activate in response to a supply voltage transient at the supply voltage terminal or a load transient at the output terminal.

5. The voltage regulator of claim 2, wherein the pull-down resistor comprises a NMOS transistor.

6. The voltage regulator of claim 1, wherein the feedforward capacitor comprises a PMOS transistor.

7. The voltage regulator of claim 1 wherein the FVF comprises a pass capacitor coupled between the gate of the pass transistor and the output voltage terminal, wherein the pass capacitor comprises a PMOS transistor.

8. The voltage regulator of claim 7, wherein the feedforward capacitor comprises an additional PMOS transistor of the same type as the PMOS transistor of the pass capacitor.

9. A transceiver for a controller area network comprising the voltage regulator of claim 1.

10. The transceiver of claim 9, wherein the FVF further comprises a pull-down transistor with a conduction channel coupled between the output terminal and the reference terminal and a gate terminal coupled to the FVF node.

11. The voltage regulator of claim 1, wherein the voltage regulator is suitable for suppressing voltage transients with a specific ramp rate wherein a capacitance of the feedforward capacitor is based on the ramp rate.

12. The voltage regulator of claim 1, wherein the output current transistor and the third FVF transistor form a current mirror and a size ratio of the third FVF transistor to the output current transistor determines a scaling factor of the current mirror.

13. The voltage regulator of claim 1, wherein the feedforward Wilson current mirror comprises a source follower circuit coupled between the supply voltage terminal and the reference terminal, wherein the source follower circuit is configured to prevent a voltage at the input current terminal falling below a threshold current value.

14. The voltage regulator of claim 1 comprising a bandgap reference circuit including a bandgap based current reference source configured to provide a control voltage to a gate terminal of the first FVF transistor.

15. The voltage regulator of claim 1, wherein the voltage regulator comprises a low dropout voltage regulator.

16. The voltage regulator of claim 1, wherein the pass transistor comprises a PMOS transistor.

17. The voltage regulator of claim 1, wherein the first FVF transistor comprises a PMOS transistor.

18. The voltage regulator of claim 1, wherein the third FVF transistor comprises a PMOS transistor.

19. The voltage regulator of claim 1, wherein the output current transistor comprises a PMOS transistor.

20. The voltage regulator of claim 1, wherein the second FVF transistor comprises a NMOS transistor.

* * * * *